US009159511B2

(12) United States Patent
Kostovic

(10) Patent No.: US 9,159,511 B2
(45) Date of Patent: Oct. 13, 2015

(54) CIRCUIT AND METHOD FOR INTERRUPTING A CURRENT FLOW IN A DC CURRENT PATH

(75) Inventor: Jadran Kostovic, Wettingen (CH)

(73) Assignee: ABB TECHNOLOGY OY, Helsinki (FI)

( * ) Notice: Subject to any disclaimer, the term of this patent is extended or adjusted under 35 U.S.C. 154(b) by 734 days.

(21) Appl. No.: 13/471,134

(22) Filed: May 14, 2012

(65) Prior Publication Data

US 2012/0286589 A1 Nov. 15, 2012

(30) Foreign Application Priority Data

May 12, 2011 (EP) .................................... 11165773

(51) Int. Cl.
*B23K 11/24* (2006.01)
*H01H 33/59* (2006.01)

(52) U.S. Cl.
CPC ............ *H01H 33/596* (2013.01); *Y10T 307/76* (2015.04)

(58) Field of Classification Search
CPC .................................................... H01H 33/596
See application file for complete search history.

(56) References Cited

U.S. PATENT DOCUMENTS

| | | | | |
|---|---|---|---|---|
| 3,737,724 | A | 6/1973 | Salge et al. | |
| 3,796,891 | A | 3/1974 | Kind et al. | |
| 4,005,340 | A * | 1/1977 | Hartel | 361/3 |
| 4,172,268 | A | 10/1979 | Kaisha | |
| 4,216,513 | A | 8/1980 | Tokuyama et al. | |
| 4,300,181 | A * | 11/1981 | Premerlani | 361/4 |
| 4,550,356 | A * | 10/1985 | Takahashi | 361/9 |
| 5,452,170 | A * | 9/1995 | Ohde et al. | 361/13 |
| 5,517,403 | A | 5/1996 | Maehara | |
| 8,427,793 | B2 * | 4/2013 | Yonezawa et al. | 361/13 |
| 8,837,093 | B2 * | 9/2014 | Panousis et al. | 361/13 |
| 2007/0064356 | A1 * | 3/2007 | Wakatsuki et al. | 361/2 |
| 2011/0175460 | A1 | 7/2011 | Åström et al. | |

FOREIGN PATENT DOCUMENTS

| | | | |
|---|---|---|---|
| CH | 164 029 | A | 9/1933 |
| CN | 1092913 | A | 9/1994 |
| DE | 20 39 065 | A1 | 2/1972 |
| DE | 28 21 548 | A1 | 11/1978 |
| SE | 387 004 | | 8/1976 |
| WO | WO 2009/149749 | A1 | 12/2009 |

OTHER PUBLICATIONS

European Search Report for EP 11165773 dated Oct. 11, 2011.

* cited by examiner

*Primary Examiner* — Jared Fureman
*Assistant Examiner* — Aqeel Bukhari
(74) *Attorney, Agent, or Firm* — Buchanan Ingersoll & Rooney PC

(57) ABSTRACT

A DC current path for DC power transmission includes a switchable element. An inductance is connected in series to the switchable element. When an interrupt scenario is detected, a resonance circuit is connected in parallel to the series connection of the switchable element and the inductance for charging a capacitance of the resonance circuit. An open state of the switchable element is effected and the resonance circuit is connected in parallel to the switchable element. By means of such arrangement and method, favorable fast interrupt times can be achieved.

31 Claims, 3 Drawing Sheets

CIRCUIT AND METHOD FOR INTERRUPTING A CURRENT FLOW IN A DC CURRENT PATH

RELATED APPLICATION

This application claims priority under 35 U.S.C. §119 to European Patent Application No. 11165773.0 filed in Europe on May 12, 2011, the entire content of which is hereby incorporated by reference in its entirety.

FIELD

The present disclosure relates to high voltage (HV) direct current (DC) transmission, and more particularly, to a circuit and a method for interrupting a current flow in a DC current path.

BACKGROUND INFORMATION

High voltage direct current transmission for transmitting energy on a large scale is regaining attention for various reasons. The re-advent of DC grids is strongly linked to a different concept of how to drive the power into the DC grid. Future DC grids may be controlled by a voltage controlled source, also known as voltage source converters (VSC). In such grids, a fault current may rise very fast in case of a short circuit and as a result may burden system reliability.

In the event of a short circuit in a known AC grid, an interrupt concept may benefit from the alternating properties of the AC current in the grid. When opening an associated circuit breaker in the AC current path, an electric arc may electrically connect such circuit breaker electrodes and may continue to allow an electric arc current to cross the circuit breaker. However, due to the nature of the AC driving source such ongoing electric arc current in the AC current path may oscillate, too, and inherently may show zero current crossings. A zero crossing in current is desired for extinguishing the electric arc and for stopping the current flow across the circuit breaker completely.

In DC grids, however, no such zero current crossing occurs as a by-product of the driving source, but a current zero in the DC current path is desired to be generated by other means when or after the circuit breaker is effected to its open state. In one approach, a current zero is caused by injecting an oscillating counter-current into the DC current path. Such oscillating counter-current may counteract the electric arc current and may finally cause at least a temporary current zero to appear in the DC current path which in turn may be used for extinguishing the electric arc at the circuit breaker and make the current flow in the DC current path stop. A means for evoking an oscillating counter-current is a resonance circuit arranged in parallel to the circuit breaker, in which the circuit breaker is more generally denoted as a switchable element or switching element below. However, in the event of connecting the resonance circuit in parallel to the switching element, a certain rise time needs to lapse before the oscillating counter-current reaches a magnitude sufficient to counterbalance the electric arc current across the switching element. Such rise time may depend on the voltage drop across the electric arc and on the capacitance present in the resonance circuit. While a high capacitance value is preferred in view of short oscillation rise times, associated capacitors are cost intensive.

In WO 2009/149749 A1, a device for breaking DC currents exceeding 2500 A is disclosed. This device includes a resonance circuit connected in parallel with an interrupter. A surge arrester is connected in parallel with the resonance circuit. The resonance circuit has a series connection of a capacitor and an inductance. The relationship of the capacitance in μF to the inductance in μH of the resonance circuit is >=1.

SUMMARY

An exemplary embodiment of the present disclosure provides a circuit arrangement for interrupting a current flow in a DC current path. The exemplary circuit arrangement includes a switchable element arranged in the DC current path, and a first inductance connected in series with the switchable element arranged in the DC current path. The exemplary circuit arrangement also includes a resonance circuit configured to be connectable in parallel to the series connection of the inductance and the switchable element by means of a first switch, and to be connectable in parallel to the switchable element without the inductance by means of a second switch.

An exemplary embodiment of the present disclosure provides a method for interrupting a current flow in a DC current path. The exemplary method includes detecting an interrupt scenario for the DC current path including a switchable element, and connecting a resonance circuit in parallel to a series connection of a first inductance and the switchable element for charging a capacitance of the resonance circuit. In addition, the exemplary method includes effecting an open state of the switchable element, and connecting the resonance circuit in parallel to the switchable element without the first inductance.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
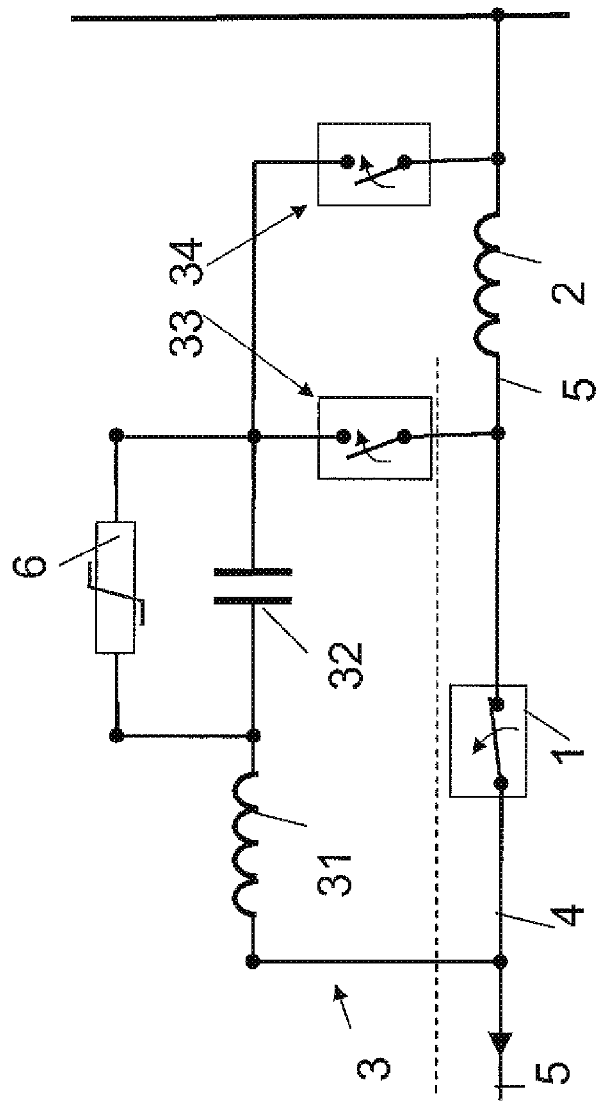
FIG. 1 is a block circuit diagram of a circuit arrangement according to an exemplary embodiment of the present disclosure.

Exemplary embodiments of the present disclosure provide a method and circuit arrangement which interrupt a current in a DC current path in a very fast manner in order to protect circuit elements of the DC current path.

Features of the circuit arrangement and method according to the present disclosure are described in more detail below with reference to exemplary embodiments.

According to the present disclosure, a voltage drop across an inductance connected in series to a switchable element of the DC current path is used for charging the capacitance in a resonance circuit, if a fault scenario is detected. Such charging inductance may, for example, be a fault current limiting inductance. In this context, it is noted that the term "resonance circuit" in the present aspect and all other aspects of the disclosure is understood as an LC circuit including an inductance and a capacitance, which may be connected in series, wherein the inductance may be embodied as a separate element or may be represented by an inductance of the line of the resonance circuit. The term "resonance circuit" therefore does not need to represent a closed loop, but may be a circuit which, in the event of being switched into a closed loop, shows a resonance characteristic.

In response to an interrupt scenario for the DC current path being detected, the resonance circuit is connected in parallel to the series connection of the switchable element and the inductance for charging the capacitance of the resonance circuit out of the energy stored in the inductance. In accordance with an exemplary embodiment, during a charging of the capacitance, the switchable element is not effected yet to its open state. The resonance circuit may, for example, be connected in parallel to the series connection of the switchable element and the inductance by means of a first switch. A switch in this context may be a device to be controllably closed and to provide an electrical connection between its contacts. Such switch may either controllably or inevitably be reopened again. In accordance with an exemplary embodiment, the first switch may be a known switch withstanding the expected currents. In another exemplary embodiment, the first switch may be a spark gap which may actively be triggered into a closed state by initiating the spark gap between its contacts, and which may interrupt automatically after the spark current is interrupted.

At some point in time, for example, after the capacitance is charged to a sufficient level, the switchable element in the DC current path may be effected into an open state. In such open state, the current across the switchable element may not be completely interrupted, since an electric arc bypassing the open contacts of the switching element may persistently allow current to flow in the DC current path. Such current is also denoted as electric arc current. The triggering or effecting into an open state of the switching element may, for example, be synchronized with disconnecting the resonance circuit from its parallel arrangement with respect to the series connection of the switchable element and the inductance, or may be effected after such disconnection.

At the time of opening the switchable element, or, for example, after such opening of the switch-able element the resonance circuit may be connected in parallel to the switching element, and for example, in parallel to the switching element solely, e.g., without the inductance. Solely shall thus in particular mean that the resonance circuit is connected to the switching element and not to the inductance; solely need not exclude elements other than the inductance to be present. For doing so, another switch may be provided, for example, in form of a spark gap. It may be assumed that at the time when the other switch is triggered to close and to connect the resonance circuit in parallel to the switchable element, the switch previously used for connecting the resonance circuit in parallel to the series connection of the switchable element and the inductance may be in a reopened state such that the inductance is not short circuited. Upon connecting the resonance circuit to the switchable element, the charged capacitance may be discharged and may evoke an oscillating counter-current of sufficient magnitude for counterbalancing the electric arc current and for generating at least a temporary current zero.

In general, throughout the present disclosure, the previous or first switch and the other or second switch shall be separate devices. Furthermore, in general, the first switch and the second switch shall be arranged in different locations. For example, the first switch may be located in a first circuit including the resonance circuit and a series connection of the switchable element and the inductance, and the first switch may be configured to close and open the first circuit. Further, the second switch may be located in a second circuit including the resonance circuit and the switchable element but not the inductance, and the second switch may be configured to close and open the second circuit.

As a result, the inductance, which may be a fault current limiting (FCL) inductance, is used to pre-charge the capacitance in the resonance circuit. In case that a fault current is detected in the DC current path or in a connected DC grid, the capacitance is charged to a relatively high voltage level, which on the other hand requires only relatively small capacitance values to be arranged in the resonance circuit. In this way, the capacitance will be stressed with a high charging voltage only for a very short time, such as a few ms. No additional device is required for charging the capacitance. No permanent charging of the capacitance is required. No pre-charged capacitance is required. And no means is required for monitoring the charging level of the capacitance permanently, since no permanent charging of the capacitance is required. In the case of a nominal current or rated current or operating current turning into a fault current in the DC current path, a passive resonance circuit is applied or switched to the DC current path. In such an embodiment, fast interruption times can be achieved, for example, in the range of equal to or less than 10 ms starting from the beginning or detection of a fault event.

Therefore, in accordance with an exemplary embodiment of the present disclosure, a circuit arrangement is provided for interrupting a current flow in a DC current path. The circuit arrangement includes an inductance connected in series with a switchable element, which switchable element is arranged in the DC current path, and a resonance circuit adapted (e.g., configured) to be connectable in parallel to the series connection of the inductance and the switchable element by means of a first switch, which resonance circuit is also adapted to be connectable in parallel to the switchable element but not the inductance by means of another or second switch.

According to an exemplary embodiment of the present disclosure, a method is provided for interrupting a current flow in a DC current path. An interrupt scenario is detected for the DC current path including a switchable element. An inductance is connected in series to the switchable element. In response to the detection of an interrupt scenario, a resonance circuit is connected in parallel to the series connection of the switchable element and the inductance for charging a capacitance of the resonance circuit. An open state of the switchable element is affected, and the resonance circuit is connected in parallel to the switchable element without the inductance.

Additional features and aspects of exemplary embodiments of the present disclosure are set forth in the description below.

The described embodiments similarly pertain to the circuit arrangement and to the method. Synergetic effects may arise from different combinations of the embodiments although they might not be described in detail.

Furthermore, it shall be noted that all embodiments of the present disclosure concerning a method might be carried out in the order of the steps as described or in any other order. The scope of the present disclosure shall include any order of steps irrespective of the order listed in the claims.

The block circuit diagram of FIG. 1 illustrates a circuit arrangement according to an exemplary embodiment of the present disclosure including a DC current path 4. The DC current path 4 may directly or indirectly, via a DC grid 5, be connected to a voltage source converter with a nominal supply voltage or rated supply voltage or operating supply voltage of 320 kV, for example. The DC current path 4 may, for example, be embodied as a transmission path for transmitting currents also denoted as nominal or rated or operating currents. The operating currents may be 1.5 kA and more, for example, between 1.5 kA and 2.5 kA. In accordance with an exemplary embodiment, the DC current path 4 denotes a section of the DC grid 5. The DC current path 4 includes a switchable element 1, and the above-described section may specifically be connectable to a resonance circuit 3. The DC grid 5 and consequently the DC current path 4 may include a transmission path for DC current, and may, for example, be a transmission line. The functional term "for DC current" shall mean that in a regular operation mode DC current is transmitted. However, in a fault handling mode current with alternating polarity may, nevertheless, be transmitted in the DC grid 5 and DC current path 4, if needed or if it may happen.

The DC current path 4 includes the switchable element 1 (for example, in the form of a circuit breaker) connected in series with an inductance 2. In the present example, the inductance 2 is arranged in the DC grid 5, but is still connected in series with the switchable element 1 of the DC current path 4. The switchable element 1 is arranged for interrupting a current flow in the DC current path 4 in the event of a failure, such as a short circuit, in order to protect circuit elements, loads, etc. The circuit breaker may be a vacuum-based circuit breaker, a gas-based circuit breaker, a combination thereof or any other suitable circuit breaker. The inductance 2 is provided for limiting currents in the DC current path 4 and in the DC grid 5, respectively, for example, for limiting a slope of a rising fault current. In the event of a short circuit in the DC current path 4 or in the DC grid 5, the current in the DC current path 4 may rise from the operating current level to a higher fault current level. The inductance 2 may be dimensioned to a value of, for example, more than 80 mH and less than 120 mH. However, the inductance 2 may only extend the rise time of a fault current but not its magnitude. For such reason, the fault current in the DC current path 4 may be wanted to be interrupted by the circuit breaker 1.

A resonance circuit 3 of the circuit arrangement includes a capacitance 32 arranged in series with another inductance 31. The other inductance 31 may be a separate circuit element or may be an inductance representing the wiring of the resonance circuit 3. The other inductance 31 may have a value between 0.5 mH and 2 mH, for example. In addition, an ohmic resistance of the resonance circuit 3 itself may need to be taken into account and may have, for example, a value between 10 μOhm and 100 μOhm. A surge arrester 6 may be connected in parallel to the capacitance 32.

The resonance circuit 3 can be connected in parallel to the series connection of the inductance 2 and the switchable element 1 by means of a first switch 34. The first switch 34 may be a switch that can controllably be switched between an ON and an OFF state and vice versa, or that can controllably be switched from an OFF to an ON state and revert to the OFF state autonomously, such as a spark gap may do, for example. In an operating condition of the DC current path 4, the first switch 34 is generally in an open state and the switchable element 1 is in a closed state. As a result, an operating current flows in the DC current path 4. In this state, the resonance circuit 3 is interrupted by the open state of the first switch 34 such that there is no current flow in the resonance circuit 3. By means of measuring the current in the DC grid 5 or in the DC current path 4, for example, or by means of measuring a voltage drop across the inductance 2 a malfunctioning of the DC grid 5 or DC current path 4 may be detected. In accordance with an exemplary embodiment, a short circuited DC grid 5 may be detected by means of current and/or voltage measurement value exceeding a threshold which may be an indicator for a failure mode. In such an event, the first switch 34 may be triggered to be closed. In accordance with an exemplary embodiment, a spark gap may be induced in such first switch 34. The first switch 34 itself or a trigger control of the first switch 34 is dimensioned such that the first switch 34 remains closed for a time sufficient for charging the capacitance 32 to a level desired for evoking a current zero in the DC current path 4, as will be explained later. For example, in case of the first switch 34 being a spark gap a scaling of the spark gap is such that the spark gap allows for a connection of sufficient time to charge the capacitance 32 sufficiently.

Another switch 33 called a second switch 33 for connecting the resonance circuit 3 to the switchable element 1 solely without involving the inductance 2 in such closed loop remains in an open state during the above steps of detecting a failure event and charging the capacitance 32. After the capacitance 32 is charged, the first switch 34 may be opened again and the capacitance 32 remains charged.

In other words, in case of a failure event, the current in the DC current path rises from the operating current level to a fault current level with a rate of rise defined by the operating voltage U and the inductance value L according to $di/dt=U/L$. Due to the high inductance value of L between 80 mH and 120 mH, almost all voltage drop will be on the inductance 2. The same voltage drop is between the open contacts of the first switch 34. By means of closing the first switch 34 in such failure scenario the capacitance 32 will be charged very quickly. An exemplary period for charging the capacitance 32 may be about 1 ms. The capacitance 32 may have a value between 1 μF and 15 μF, for example, less than 20 μF.

After or simultaneously with re-opening the first switch 34 the switchable element 1 is effected to open. The opening of the switchable element 1 may coincide with a closing signal for the closing of the second switch 33. Once the second switch 33 is activated and closed, the LC resonance circuit 3 is connected in parallel to the switchable element 1 without the charging inductance 2. Although the switchable element 1 being in an open state, an electric arc may occur due to the high voltages involved. Such electric arc may allow a current to flow in the DC current path 4.

By closing the second switch 33 the resonance circuit 3 forms a closed loop over the electric arc. By closing the loop, an oscillating current denoted as counter-current is generated by the resonance circuit 3 and in particular is generated by discharging the capacitance 32. Such evoked oscillating current superimposes the electric arc current in the DC current path 4 and effects at least temporarily at least one current zero value in the total current in the DC current path 4. Such current zero value in turn is a condition for the completely breaking of the current across the switchable element 1 by extinguishing means of the switchable element 1.

Since the voltage drop across the inductance 2 is used for charging the capacitance 32 in the event of a failure, which voltage drop is a large scale voltage drop due to the dimensioning of the inductance 2, the capacitance 32 is pre-charged with a high voltage which in turn requires only a relative low capacitance value of, for example, 10 μF. Such capacitance value may be sufficient for inducing an oscillating counter-current with a magnitude for temporarily compensating the fault current in the DC current path 4. This, in turn, may reduce the cost of the circuit arrangement.

Figure 4:
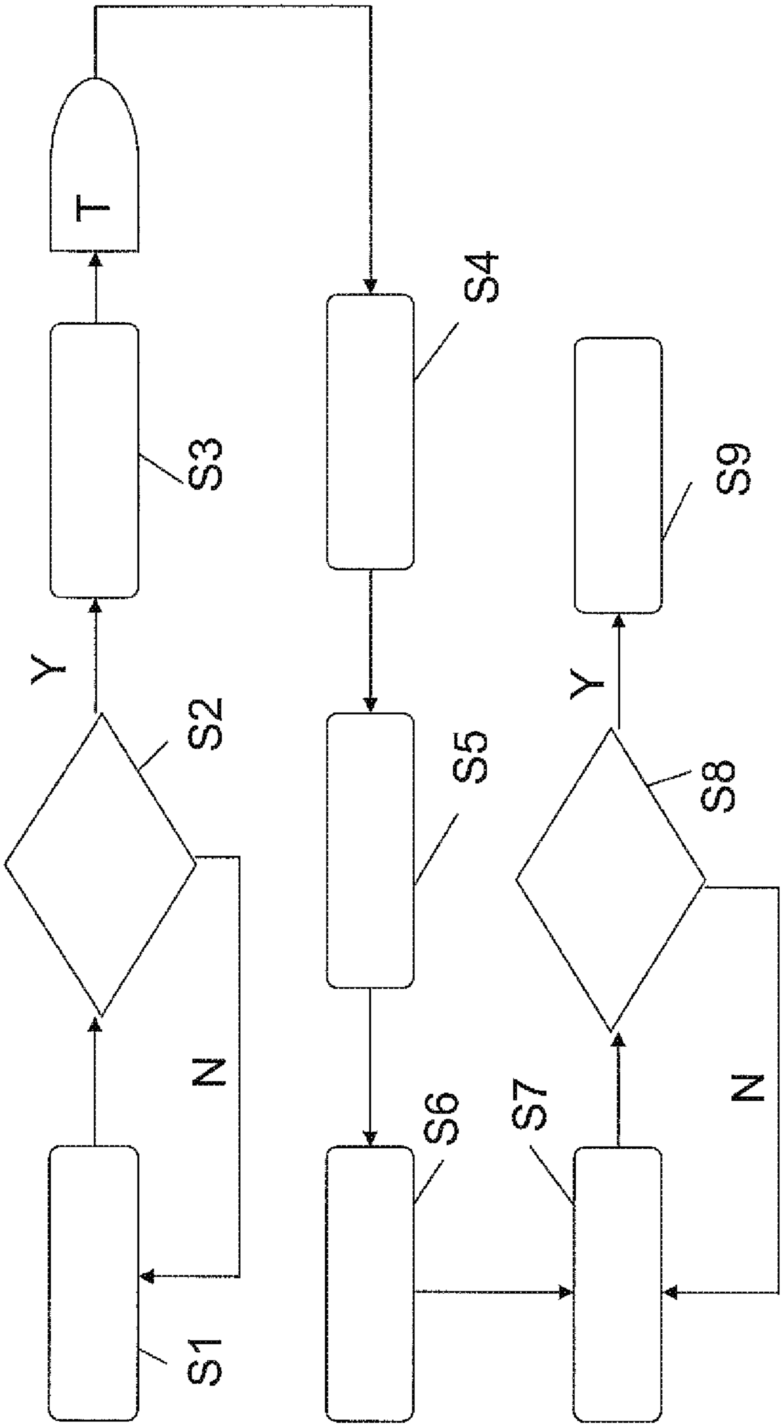
FIG. 4 is a flow diagram illustrating a method for interrupting a current flow in a DC current path according to an exemplary embodiment of the present disclosure.

FIG. 4 illustrates a flow chart representing a method for interrupting a current in a DC current path according to an exemplary embodiment of the present disclosure. In the following, the term "step" means "method element" and does not require or imply an order or sequence of steps or method elements to be performed according to the numbering of the step or method element. In step S1, the DC current path or the DC grid is monitored for a failure event such as a short circuit, for example, by monitoring an associated current. In step S2, it is determined if such current exceeds a threshold which may be taken as an indicator for a failure event. In case the current does not reach or exceed the threshold (N) the DC current path or the DC grid respectively is continued to be monitored. In case that the current exceeds the threshold (Y), in step S3 a first switch connects a resonance circuit including at least a capacitance in parallel to a series connection of a switchable element, such as a circuit breaker, and a fault current limiting inductance. The following timer T indicates that the first switch may remain in a closed state for a certain time T which is considered to be sufficient for charging the capacitance of the resonance circuit with a high voltage resulting from the voltage drop across the inductance. After time T the connection may be disconnected either by active control means or by an autonomous opening of the first switch contacts in case of a spark gap in step S4.

In step S5, which may follow step S4 or may coincide with step S4, the switchable element is operated into an open state. As a result, an electric arc current flows in the DC current path. In step S6, which may follow step S5 or may coincide with step S5, a second switch is closed for connecting the resonance circuit to the switchable element only, e.g., without the inductance 2. The second switch 33 is now closed while the first switch 34 is in a reopened state again. This induces an oscillating counter-current in the DC current path. In step S7, it is monitored whether the counter-current is already or not yet of sufficient magnitude to fully counterbalance the electric arc current, for example, whether the total current in the DC current path not yet shows a zero crossing. If this is not the case (N), the system continues monitoring in step S7. If this is the case (Y), the electric arc across the switchable element 1 is extinguished by known means.

Figure 2:
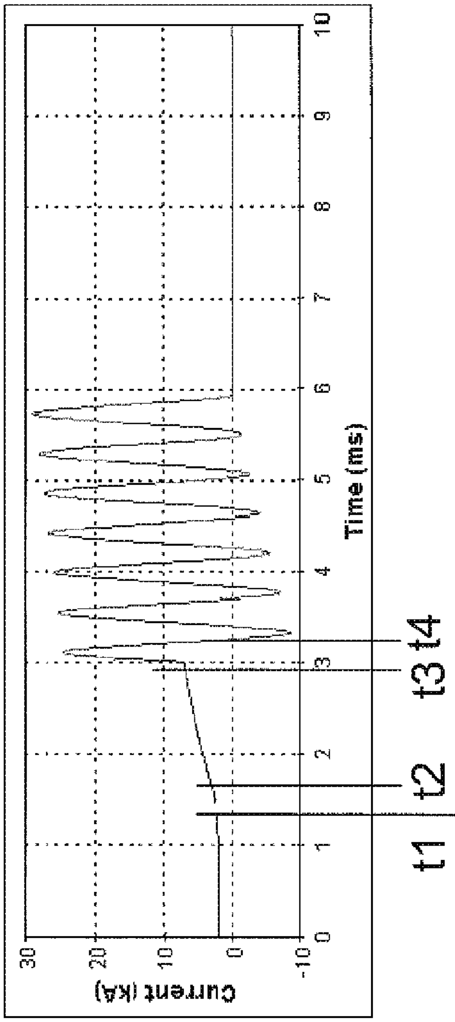
FIG. 2 is a chart illustrating a sample current characteristic over time in a DC current path during a short circuit having a method for interrupting a current flow in the DC current path applied according to an exemplary embodiment of the present disclosure.

In FIG. 2, the exemplary graph depicts a current characteristic in a DC current path in a failure scenario wherein the above circuit arrangement and the above method are applied. Prior to time t1, the current in the DC current path is equal to the operating current of e.g. ~2 kA. At time t1, a failure in the DC current path occurs and results in a rising current. At time t2 such fault current is detected and the resonance circuit 3 is connected in parallel to the series connection of the inductance 2 and the switchable element 1 for charging the capacitance 32 in the resonance circuit 3. At time t3, the capacitance 32 is being charged and may be disconnected from the DC current path 4. The switchable element 1 is activated to an open state. An electric arc will be generated and the resonance circuit 3 will be connected to the switchable element 1 for discharging the capacitance 32 and for subsequently building an oscillating counter-current superimposing the electric arc current. All this is assumed to occur at time t3. As a result, the total current in the DC current path 4 shows a current zero crossing even within the first sine wave of the oscillating counter-current at time t4. At such point in time or any subsequent point in time with a current zero the electric arc may be extinguished by known means.

Figure 3:
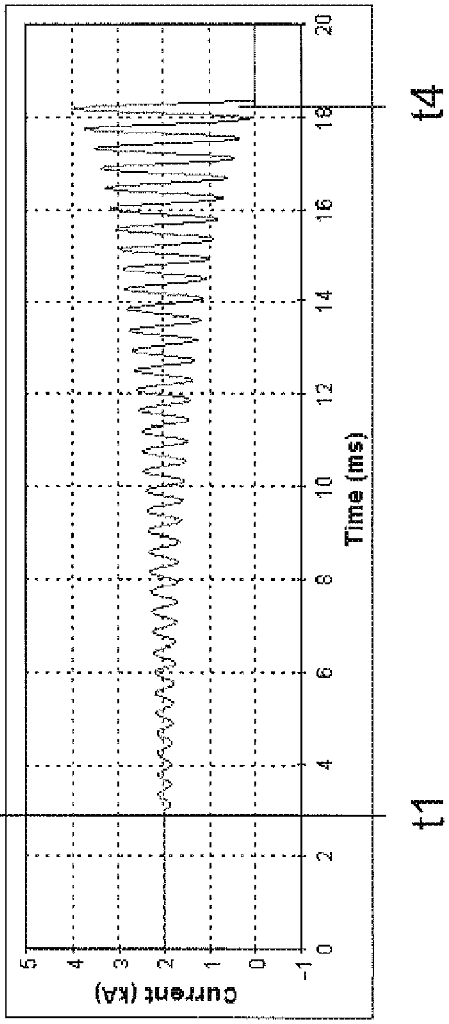
FIG. 3 is a chart illustrating a sample current characteristic over time in a DC current path when a known method is applied for interrupting a nominal or rated or operating current.

In contrast, FIG. 3 shows for comparison a graph of a current characteristic in a DC current path in a known circuit arrangement. In such a known passive circuit arrangement, an operating current of ~2 kA is interrupted by applying a resonance circuit to the DC current path without the capacitance in the resonance circuit being charged up-front. In such scenario, an oscillation is generated which needs a considerable time to grow in magnitude. A current zero crossing may in this known passive circuit be reached at t4=18 ms. In contrast, by applying the method according to the present disclosure for interrupting a fault current, a current zero crossing may be achieved favourably already at t4=3.25 ms, as is shown in FIG. 2.

According to an exemplary embodiment of the present disclosure, for an operating current of up to 2.5 kA a fault may be defined at an at least 10% deviation from the nominal operating current, and such fault current may be interrupted very fast by a circuit arrangement and/or method as disclosed above.

All appended claims in their entirety and inclusive all their claim dependencies are herewith literally incorporated into the description by reference.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A circuit arrangement for interrupting a current flow in a DC current path, comprising:

a switchable element arranged in the DC current path;

a first inductance connected in series with the switchable element arranged in the DC current path; and a resonance circuit configured to be connectable in parallel to the series connection of the inductance and the switchable element by means of a first switch, and to be connectable in parallel to the switchable element without the inductance by means of a second switch.

2. The circuit arrangement according to claim 1, wherein the resonance circuit comprises a capacitance and a second inductance connected in series, wherein the first inductance is configured to charge the capacitance when the first switch is closed.

3. The circuit arrangement according to claim 1, wherein at least one of:

the first inductance is a fault current limiting inductance, and the switchable element comprises a circuit breaker with a negative slope in its arc voltage-over-current characteristic.

4. The circuit arrangement according to claim 1, wherein at least one of:

the first switch and the second switch are separate devices, the first switch and the second switch are arranged in different locations, and at least one of the first switch and the second switch comprises a spark gap.

5. The circuit arrangement according to claim 1, wherein the first inductance has an inductance value between 80 mH and 120 mH.

6. The circuit arrangement according to claim 2, wherein the capacitance has a capacitance value of less than 20 μF.

7. A method for interrupting a current flow in a DC current path, the method comprising:

detecting an interrupt scenario for the DC current path including a switchable element;

connecting a resonance circuit in parallel to a series connection of a first inductance and the switchable element for charging a capacitance of the resonance circuit;

effecting an open state of the switchable element; and connecting the resonance circuit in parallel to the switchable element without the first inductance.

8. The method according to claim 7, comprising:

monitoring at least one of a current in a DC grid including the DC current path and a voltage drop across the first inductance for detecting an interrupt scenario.

9. The method according to claim 7, wherein the capacitance is in an uncharged state prior to connecting the resonance circuit in parallel to the series connection of the switchable element and the first inductance.

10. The method according to claim 7, wherein the switchable element remains in a closed state during the resonance circuit being connected in parallel to the series connection of the switchable element and the first inductance.

11. The method according to claim 7, wherein the resonance circuit is connected in parallel to the series connection of the switchable element and the first inductance by means of activating a first switch, the resonance circuit is connected in parallel to the switchable element without the first inductance, and the resonance circuit is connected in parallel solely to the switchable element by means of activating a second switch.

12. The method according to claim 11, wherein at least one of:

the first switch and the second switch are separate devices, the first switch and the second switch are arranged in different locations, and at least one of the first switch and the second switch comprises a spark gap.

13. The method according to claim 7, wherein at least one of:

the first inductance is a fault current limiting inductance, and the switchable element comprises a circuit breaker with a negative slope in its arc voltage-over-current characteristic.

14. The method according to claim 7, wherein the resonance circuit is connected in parallel to the switchable element without the first inductance, and wherein the resonance circuit is connected in parallel solely to the switchable element, at the same time or after the open state of the switchable element is effected.

15. The method according to claim 7, wherein the resonance circuit is disconnected by opening the first switch, from the series connection of the switchable element and the first inductance prior to connecting the resonance circuit in parallel to the switchable element without the first inductance.

16. The method according to claim 7, wherein the resonance circuit is connected in parallel to the switchable element without the first inductance while the switchable element is in its open state for effecting a counter-current in the DC current path path by discharging the capacitance, and the counter-current is superimposed to an electric arc current in the DC current path flowing through an electric arc bypassing the open-state switchable element.

17. The method according to claim 16, wherein the counter-current is an oscillating counter-current of sufficient magnitude for temporarily counterbalancing the electric arc current and for effecting a temporary current zero in the DC current path.

18. The circuit arrangement according to claim 2, wherein at least one of:

the first inductance is a fault current limiting inductance, and the switchable element comprises a circuit breaker with a negative slope in its arc voltage-over-current characteristic.

19. The circuit arrangement according to claim 18, wherein at least one of:

the first switch and the second switch are separate devices, the first switch and the second switch are arranged in different locations, and at least one of the first switch and the second switch comprises a spark gap.

20. The circuit arrangement according to claim 19, wherein the first inductance has an inductance value between 80 mH and 120 mH.

21. The circuit arrangement according to claim 18, wherein the capacitance has a capacitance value of less than 20 μF.

22. The method according to claim 8, wherein the capacitance is in an uncharged state prior to connecting the resonance circuit in parallel to the series connection of the switchable element and the first inductance.

23. The method according to claim 22, wherein the switchable element remains in a closed state during the resonance circuit being connected in parallel to the series connection of the switchable element and the first inductance.

24. The method according to claim 23, wherein the resonance circuit is connected in parallel to the series connection of the switchable element and the first inductance by means of activating a first switch, the resonance circuit is connected in parallel to the switchable element without the first inductance, and the resonance circuit is connected in parallel solely to the switchable element by means of activating a second switch.

25. The method according to claim 24, wherein at least one of:

the first switch and the second switch are separate devices, the first switch and the second switch are arranged in different locations, and at least one of the first switch and the second switch comprises a spark gap.

26. The method according to claim 23, wherein at least one of:

the first inductance is a fault current limiting inductance, and the switchable element comprises a circuit breaker with a negative slope in its arc voltage-over-current characteristic.

27. The method according to claim 23, wherein the resonance circuit is connected in parallel to the switchable element without the first inductance, and wherein the resonance circuit is connected in parallel solely to the switchable element, at the same time or after the open state of the switchable element is effected.

28. The method according to claim 23, wherein the resonance circuit is disconnected by opening the first switch, from the series connection of the switchable element and the inductance prior to connecting the resonance circuit in parallel to the switchable element without the first inductance.

29. The method according to claim 23, wherein the resonance circuit is connected in parallel to the switchable element without the first inductance while the switchable element is in its open state for effecting a counter-current in the DC current path path by discharging the capacitance, and the counter-current is superimposed to an electric arc current in the DC current path flowing through an electric arc bypassing the open-state switchable element.

30. The method according to claim 29, wherein the counter-current is an oscillating counter-current of sufficient magnitude for temporarily counterbalancing the electric arc current and for effecting a temporary current zero in the DC current path.

31. The method according to claim 7, wherein:

the switchable element is arranged in the DC current path;

the first inductance is connected in series with the switchable element arranged in the DC current path; and the resonance circuit is configured to be connectable in parallel to the series connection of the inductance and the switchable element by means of a first switch, and to be connectable in parallel to the switchable element without the inductance by means of a second switch.

* * * * *